(12) United States Patent
Lee (10) Patent No.: US 7,186,085 B2
(45) Date of Patent: Mar. 6, 2007

(54) MULTIFORM FILM COOLING HOLES

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/991,805

(22) Filed: Nov. 18, 2004

(65) Prior Publication Data

US 2006/0104807 A1    May 18, 2006

(51) Int. Cl.
*F01D 5/08* (2006.01)
*F01D 5/18* (2006.01)
(52) U.S. Cl. ................................... 416/97 R
(58) Field of Classification Search ............... 415/115; 416/97 R
See application file for complete search history.

(56) References Cited

U.S. PATENT DOCUMENTS

| | | | |
|---|---|---|---|
| 4,601,638 A | 7/1986 | Hill et al. | |
| 4,653,983 A | 3/1987 | Vehr | |
| 4,676,719 A | 6/1987 | Auxier et al. | |
| 4,684,323 A | 8/1987 | Field | |
| 4,762,464 A | 8/1988 | Vertz et al. | |
| 5,660,525 A | 8/1997 | Lee et al. | |
| 5,993,150 A * | 11/1999 | Liotta et al. | ................. 415/115 |
| 6,092,982 A | 7/2000 | Ikeda et al. | |
| 6,176,676 B1 * | 1/2001 | Ikeda et al. | ................. 415/115 |
| 6,267,552 B1 * | 7/2001 | Weigand | ...................... 415/115 |
| 6,354,797 B1 | 3/2002 | Heyward et al. | |
| 6,514,037 B1 | 2/2003 | Danowski et al. | |
| 6,742,987 B2 | 6/2004 | Correia et al. | |

OTHER PUBLICATIONS

Schiele et al, "Gas Turbine Heat Transfer: Past and Future Challenges," J. of Propulsion and Power, AIAA, vol. 16, No. 4, Jul.-Aug. 2000, pp. 583-589.

* cited by examiner

*Primary Examiner*—Edward K. Look
*Assistant Examiner*—Devin Hanan
(74) *Attorney, Agent, or Firm*—Stephen H. Friskney; Francis L. Conte (57) ABSTRACT

A turbine wall includes a plurality of first and second film cooling holes arranged in a common row. The holes have multiple forms and alternate in the row for collectively providing film cooling performance therefrom.

31 Claims, 6 Drawing Sheets

MULTIFORM FILM COOLING HOLES

BACKGROUND OF THE INVENTION

The present invention relates generally to gas turbine engines, and, more specifically, to cooling therein.

A typical gas turbine engine includes a multistage compressor that pressurizes air which is then mixed with fuel in a combustor for generating hot combustion gases. Energy is extracted from the gases in multiple turbine stages for powering the compressor and producing useful work by powering a fan in an aircraft turbofan application, or powering an output shaft for marine and industrial applications.

The hot combustion gases flow along various components of the engine, which in turn are typically cooled by using a portion of the pressurized air bled from the compressor. For example, the combustion gases are born in the combustor which is typically defined by radially outer and inner annular combustion liners. The liners are typically provided with film cooling holes extending therethrough through which the pressurized compressor bleed air is channeled for effecting thermally insulating films of cooling air downstream from the outlets thereof.

The combustor also includes air swirlers, baffles, and splashplates surrounding corresponding fuel injectors in the upstream dome of the combustor, and additional patterns of film cooling holes are provided in this region for component cooling.

The hot combustion gases are initially discharged into a high pressure turbine nozzle which includes a row of stator nozzle vanes. The vanes are hollow and include film cooling holes in the sidewalls thereof for discharging film cooling air over the outer surface of the vane airfoils.

The first stage turbine also includes a row of turbine rotor blades extending radially outwardly from a supporting rotor disk. Each blade includes a hollow turbine airfoil with various rows of film cooling holes extending through the sidewalls thereof for film cooling the outer surfaces thereof.

Surrounding the turbine blades is a turbine shroud suspended from a surrounding casing. The turbine shroud typically also includes film cooling holes extending therethrough for film cooling the radially inner surface thereof which surrounds the blade tips.

Film cooling holes are also found in other components of the typical gas turbine engine and are arranged in various patterns for promoting a film cooling blanket of air over the outboard surfaces thereof which bound the hot combustion gases. The film cooling holes are typically arranged in linear rows, with the rows being spaced laterally apart for distributing the film cooling air as required for accommodating the local heat loads from the combustion gases.

The configuration, quantity, and pattern of the film cooling holes are specifically tailored for the expected heat load which varies from component to component and over the outboard surface of the individual component. A major objective is to minimize the amount of film cooling air bled from the compressor which is therefore not used in the combustion process and reduces efficiency of the engine.

However, performance of the film cooling holes is affected by the specific geometry thereof and the local conditions in the specific components including the differential pressure or pressure ratio between the outboard and inboard sides of the film cooling holes, and the velocity and pressure distribution of the combustion gases over the outboard surfaces.

The typical film cooling hole is tubular or cylindrical and manufactured by laser drilling for example. The film cooling hole is inclined through the component wall, with an inlet on the inboard side of the wall and an outlet on the outboard side of the wall. Each inclined film cooling hole therefore discharges a local jet of cooling air under a corresponding differential driving pressure across the component wall and with a corresponding discharge velocity through the hole outlet.

The blowing ratio of the differential pressure acting across the component wall affects the tendency of the discharged film cooling air jet to separate or blow-off from the outboard surface which is undesirable. The typical film cooling hole has a shallow inclination angle of about 30 degrees to ensure that the discharged film cooling air remains attached to the outboard surface and forms a film which extends downstream therealong in the aft direction corresponding with the predominant direction of the combustion gas flow.

Each row of film cooling holes has a specific pitch spacing between the centerlines of adjacent holes so that the separate jets of cooling air spread laterally in the downstream direction from the common row for promoting a continuous film of cooling air both laterally and aft along the component wall.

As the film cooling air flows aft from the film cooling hole outlet its cooling effectiveness diminishes as it begins to mix with the combustion gases flowing thereover. Accordingly, additional rows of film cooling holes are typically used and spaced transversely apart in the downstream direction for reenergizing the film cooling air from the preceding row of film cooling holes and ensuring effective film cooling air coverage over the outboard surface of the component for thermally insulating the component from the hot combustion gases.

Another form of film cooling hole is the diffusion hole which has various configurations in the art. In the diffusion hole the outlet portion thereof diverges or increases in flow area in the downstream aft direction from the upstream inlet for reducing the discharge velocity therefrom. An exemplary diffusion hole has a trapezoidal outlet with side edges which diverge at a suitably small diffusion angle, and an inner land which blends with the component outboard surface at a shallower inclination angle than the nominal inclination angle through the inlet portion of the hole.

In this way, the typical diffusion hole is effective for laterally spreading the discharged cooling air jet and locally enhancing film cooling performance.

In view of the complexity of the diverging diffusion film cooling holes, they are typically manufactured by electrical discharge machining (EDM) which requires a specially configured EDM electrode matching the desired configuration of the diffusion hole. EDM hole drilling is substantially more expensive than typical laser drilling of the cylindrical film cooling holes, and in view of the large number of film cooling holes typically found in an individual component, substantially increases the cost of manufacturing.

A typical turbine component such as a turbine rotor blade or nozzle vane may use various rows of cylindrical film cooling holes and shaped diffusion holes in different regions thereof for maximizing film cooling performance in the local regions of the blade subject to different thermal loads during operation. Rows of cylindrical film cooling holes and rows of diffusion holes have corresponding pitch spacing and have different performance and effectiveness both laterally from the row of holes and in the downstream aft direction. In either configuration, the effective coverage and density of the holes is correspondingly different, and correspondingly affects film cooling air performance, as well as the cost of manufacture due to the different complexity thereof.

Accordingly, it is desired to provide an improved film cooling arrangement for gas turbine engine components.

BRIEF DESCRIPTION OF THE INVENTION

A turbine wall includes a plurality of first and second film cooling holes arranged in a common row. The holes have multiple forms and alternate in the row for collectively providing film cooling performance therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
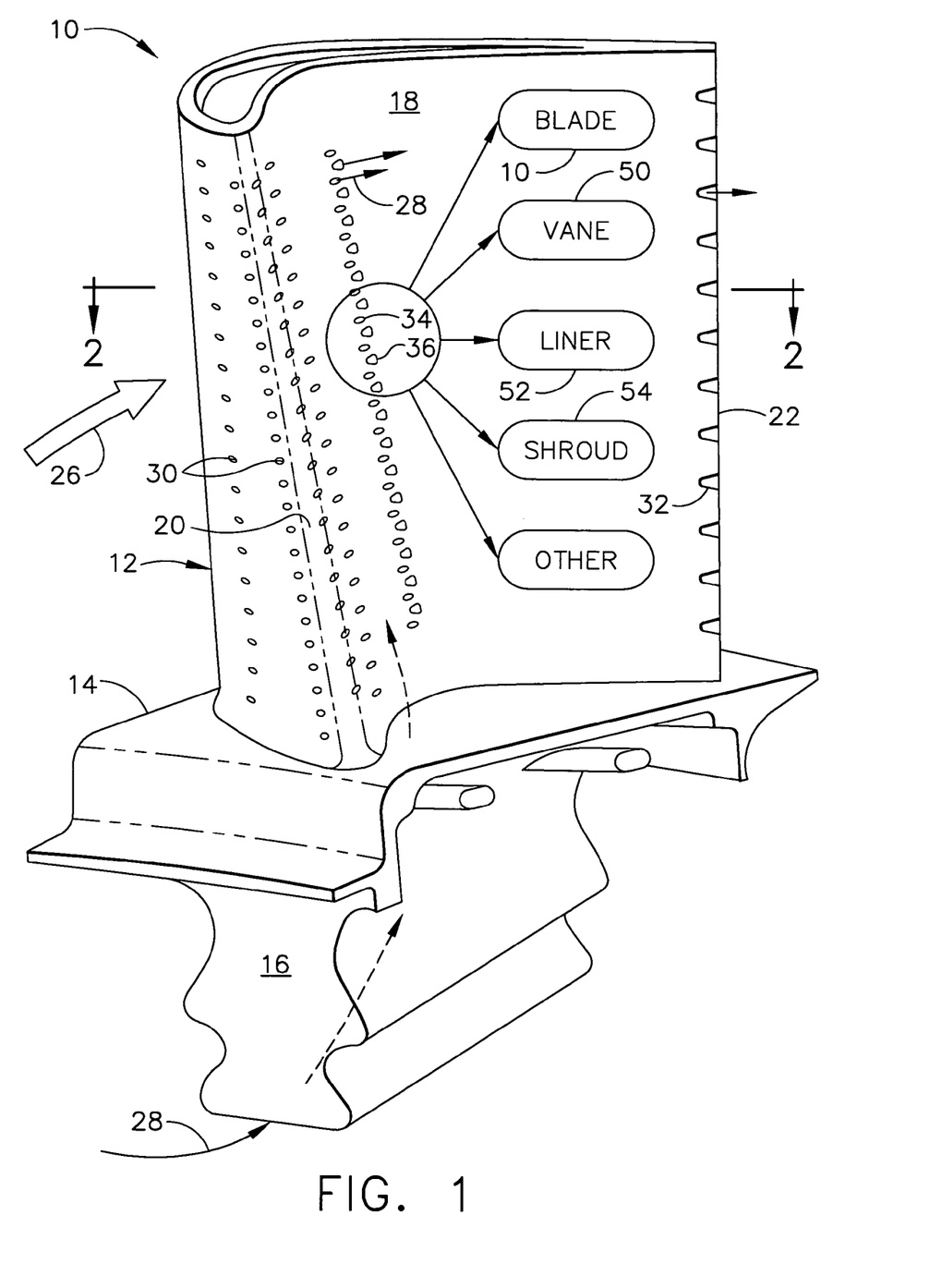
FIG. 1 is an isometric view of an exemplary gas turbine engine turbine rotor blade including multiform film cooling holes in an exemplary embodiment.

An exemplary component of a gas turbine engine in the form of a turbine rotor blade 10 is illustrated in FIG. 1. The blade includes an airfoil 12 integrally joined to a platform 14 at the root thereof which in turn is joined to a supporting axial-entry dovetail 16 for mounting the blade to the perimeter of turbine rotor disk (not shown) is a conventional manner.

Figure 2:
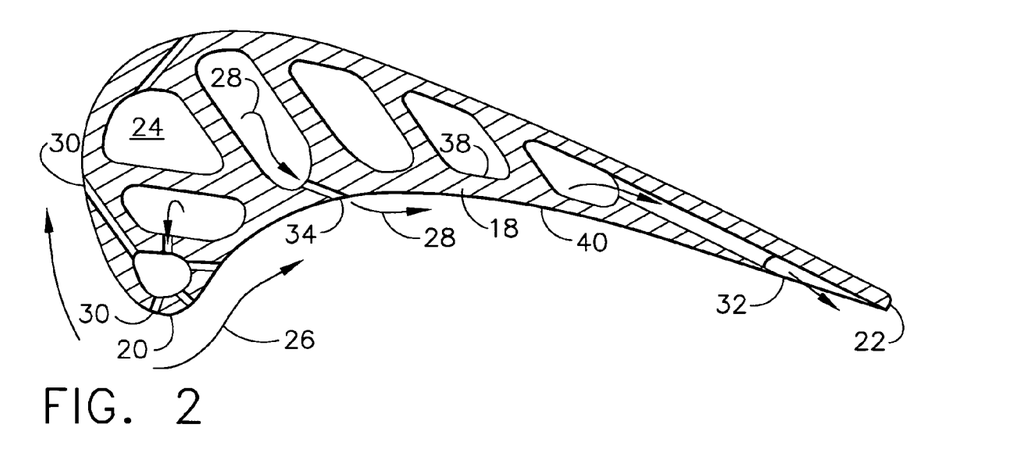
FIG. 2 is a radial sectional view through the blade airfoil illustrated in FIG. 1 and taken along line 2—2.

As additionally shown in FIG. 2, the airfoil is hollow and is bounded by a thin sidewall 18 which defines a generally concave pressure side of the airfoil and an opposite, generally convex suction side of the airfoil which extend in chord in the axial downstream direction between a leading edge 20 and an opposite trailing edge 22.

The airfoil includes an internal cooling circuit 24 which may have any conventional configuration and typically includes radially extending channels separated by radial partitions bridging the two sides of the airfoil in one or more dedicated circuits, typically including multi-pass serpentine circuits as conventionally known.

During operation, combustion gases 26 are generated in a combustor (not shown) and flow downstream over the outer surface of the airfoil 12. Pressurized cooling air 28 is bled from a compressor (not shown) and suitably channeled through inlet apertures extending radially through the blade dovetail 16 to feed the internal cooling circuit 24.

The internal cooling circuit for the blade illustrated in FIG. 1 may be configured as desired for cooling the different portions of the airfoil between the leading and trailing edges, and typically includes various radial rows of conventional film cooling holes 30 extending through the pressure and suction sides thereof for discharging the cooling air 28 from the internal cooling circuit 24. The thin trailing edge 22 of the airfoil is also typically cooled by a row of pressure-side trailing edge cooling holes 32 in any conventional configuration.

In the exemplary embodiment illustrated in FIGS. 1 and 2, the film cooling holes 30 are arranged in various rows around the leading edge region of the airfoil in conventionally known showerhead and gill hole configurations. In this way, the specifically configured film cooling holes provide local cooling of the different portions of the leading edge on the pressure and suction sides thereof to accommodate the different thermal loads from the combustion gases which flow over the pressure and suction sides of the airfoil with different pressure and velocity distributions.

The exemplary film cooling holes 30 are typical cylindrical or tubular holes inclined through the airfoil sidewall at various inclination angles relative to the changing profile of the airfoil around the leading edge for effecting film cooling thereof.

FIGS. 1 and 2 also illustrate film cooling holes in an improved configuration at an exemplary location along the pressure side of the airfoil, although these holes may be located wherever desired in the airfoil, or other turbine engine components which require film cooling. More specifically, the sidewall, or simply wall, 18 of the airfoil is relatively thin and bounds the internal cooling circuit 24 and includes a common row of laterally alternating multiform film cooling holes 34,36 extending longitudinally through the wall in flow communication with the internal cooling circuit 24 for receiving the pressurized cooling air 28 first used for inside cooling the airfoil.

The film cooling first holes 34 are arranged colinearly along the radial span of the airfoil in a row generally normal to the downstream direction of the combustion gases. And, the film cooling second holes 36 are also arranged colinearly along the span of the airfoil in a common row with the first holes 34, and alternate laterally with respective ones thereof.

Figure 3:
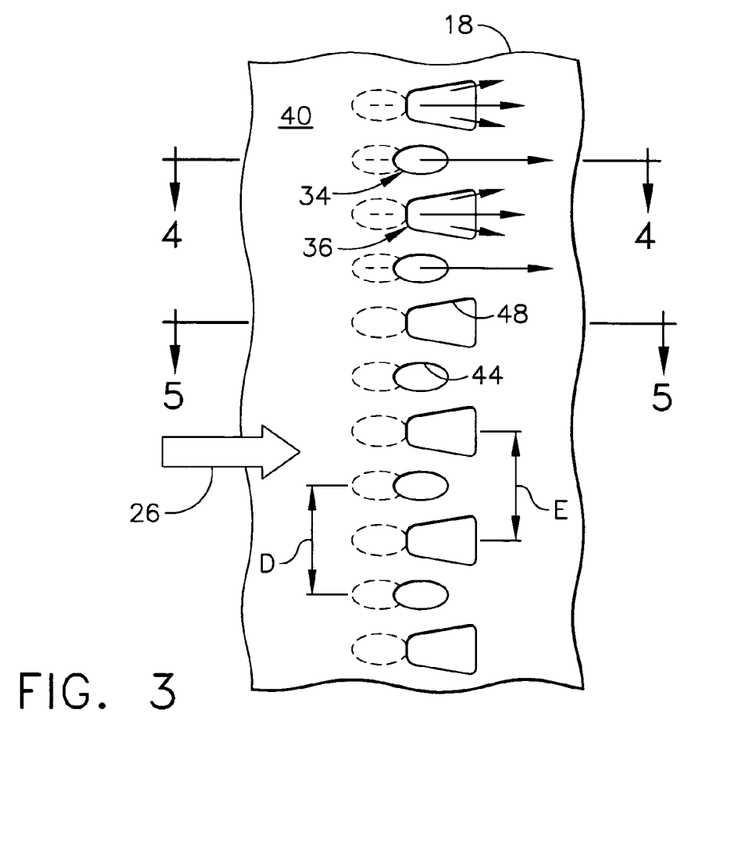
FIG. 3 is an enlarged elevational view of a portion of the row of multiform holes illustrated in FIG. 1.

FIG. 3 illustrates in more detail the common row or radial column of multiform holes 34,36 extending through the airfoil. The multiform holes 34,36 are specifically configured differently from each other for complementing the cooling performance thereof in the single or common longitudinal row extending along the airfoil span. The first holes 34 are tubular or cylindrical and extend straight through the sidewall 18. The second holes 36 have a different form than the first holes and are preferably in the form of diverging diffusion film cooling holes which may have any conventional configuration.

Figure 4:
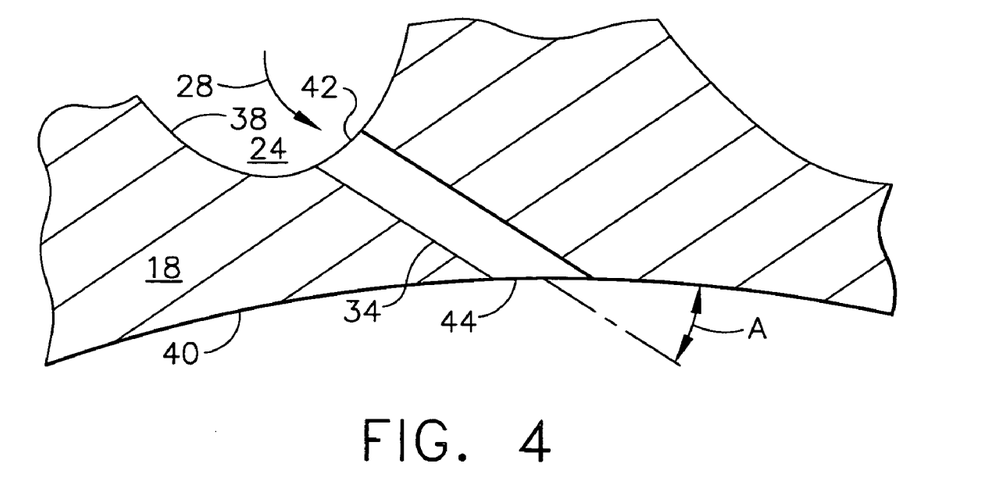
FIG. 4 is an enlarged radial sectional view of cylindrical first film cooling holes illustrated in FIG. 3 and taken along line 4—4.
Figure 5:
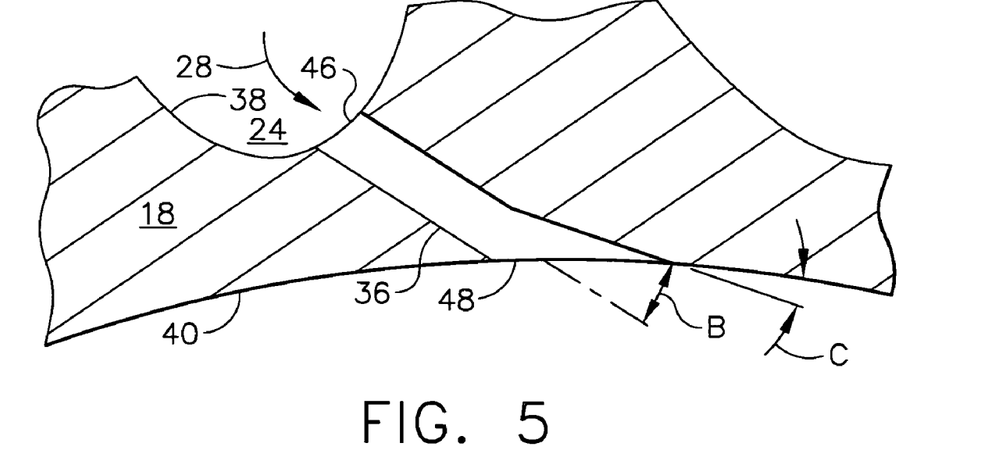
FIG. 5 is an enlarged radial sectional view through diffusion second film cooling holes illustrated in FIG. 3 and taken along line 5—5.

FIGS. 4 and 5 illustrate in sectional view the different forms of the first and second holes 34,36 which extend through the common sidewall 18 between the inside or inboard surface 38 thereof and the external or outboard surface 40 thereof. The tubular first hole 34 illustrated in FIG. 4 is preferably inclined through the wall 18 at a shallow inclination angle A of about 30 degrees for example. The diffusing second hole 36 is different in form than the cylindrical first hole 34, and is also preferably inclined through the wall 18 at a corresponding inclination angle B.

Each of the first holes 34 illustrated in FIG. 4 includes a corresponding first inlet 42 in the form of an aperture in the inboard surface 38 of the wall, and a longitudinally opposite first outlet 44 in the form of an aperture in the outboard surface 40 of the airfoil.

Each of the second holes 36 illustrated in FIG. 5 includes a corresponding second inlet 46 in the form of an aperture in the inboard surface 38, and a larger second outlet 48 in the form of an aperture in the outboard surface 40.

The first and second holes 34,36 illustrated in FIGS. 3–5 may each have any conventional configuration, but with enhanced performance in the commingled row thereof. For example, the cylindrical first holes 34 are inclined through the sidewall 18 and create oval or elliptical first inlets 42 and outlets 44 on the opposite inboard and outboard surfaces due to the inclination angle thereof.

The second holes 36 may have cylindrical second inlets 46 extending in forward part through the sidewall, and the holes 36 diverge in aft part through the sidewall to a generally trapezoidal second outlet 48 on the outboard surface.

The cylindrical portions of the two sets of holes 34,36 may be substantially identical in diameter or flow area, with the first and second inlets 42,46 and the first outlet 44 being substantially identical in form and flow area if desired.

As shown in FIGS. 4 and 5, the first and second holes 34,36 are preferably similarly inclined through the sidewall 18 at corresponding longitudinal inclination angles A,B which may be equal to each other and about 30 degrees for example. The second holes 36 diverge longitudinally aft from their cylindrical inlets preferably at a shallower inclination angle C at or near the corresponding second outlets 48 in the outboard surface 40.

The inclination angle C of the hole outlet may be about 15 degrees, for example, which permits diffusion of the cooling air 28 in the aft direction and smooth blending thereof with the exposed outboard surface 40 downstream therefrom. As shown in FIG. 3, the exemplary trapezoidal outlet 48 is symmetrical and has diverging sides, each having a suitably small diffusion angle of about 7.5 degrees for example which cooperates with the shallow inclination angle C in a conventional manner.

In both forms of film cooling holes 34,36 illustrated in FIGS. 4 and 5, the tubular inlet portions thereof meter the discharge of the pressurized cooling air 28 from the internal cooling circuit of the airfoil. The diverging diffusion outlets 48 of the second holes 36 reduce the discharge velocity therefrom and laterally spread the film cooling air in the span direction as illustrated schematically in FIG. 3.

In this way, a relatively high velocity jet of cooling air may be discharged from the cylindrical first holes 34 in the same flow direction as the combustion gases, and between the corresponding relatively low velocity jets of film cooling air discharged from the adjacent second holes 36.

The different forms of the two film cooling holes, the different performance thereof, and the different distribution of the cooling air jets discharged therefrom may be used to preferentially complement the performance therebetween for effecting a collective film of cooling air discharged downstream from the common lateral row thereof.

As indicated above, film cooling holes discharge jets of cooling air that have film cooling effect which extends downstream therefrom with a narrow lateral distribution in the radial span direction. The two forms of film cooling holes may be packed with a corresponding collective density thereof and corresponding coverage or footprint of the corresponding outlets thereof for enhancing both the downstream or aft effectiveness of the collective film of cooling air as well as the lateral effectiveness of the film cooling air from hole to hole along the longitudinal extent of the common row thereof.

Furthermore, the different forms of the first and second outlets 44,48 permit complementary coverage between the two types of holes, and the two types of holes may be conventional manufactured using less expensive laser drilling for the cylindrical holes 34 and more expensive EDM machining for the shaped diffusion holes 36. Accordingly, instead of using a full row of the diffusion holes 36 alone, and their attendant high cost, the diffusion holes may be alternated with the less expensive laser drilled holes 34 for reducing cost of the airfoil, as well as enhancing performance of the pressurized cooling air discharged from the common row of multiform holes.

As indicated above, the individual film cooling holes 34 and 36 may have any suitable conventional configuration thereof, the former without diffusion and the latter with diffusion, and arranged in a common row laterally side-by-side for complementing the configuration and performance thereof. For example, FIG. 3 illustrates that the first outlets 44 are colinearly aligned with the second outlets 48 along the radial or longitudinal span of the sidewall, with the upstream ends of the two different outlets being generally aligned with each other. Since the two outlets have different forms, the downstream ends thereof may or may not be similarly aligned.

In the exemplary embodiment illustrated in FIG. 3 the nominal diameters of the first holes 34 and the inlets of the second holes 36 may be identical in the exemplary range of 10–40 mils. The nominal inclination angles A,B may also be equal to each other, and about 30 degrees for example. In this configuration, the trapezoidal second outlets 48 will be larger in discharge flow area than that of the second outlets 44.

However, the two sides of the trapezoidal second outlets 48 diverge in the downstream direction and provide converging lands between adjacent second holes 36 in which respective ones of the oval first outlets 44 may be conveniently centered therein.

The first holes 34 illustrated in FIG. 3 preferably have a uniform pitch spacing D, and the second holes 36 preferably also have a uniform pitch spacing E. Furthermore, the pitch spacing of all the holes 34,36 in the common row may be substantially equal, with the pitch spacing D being equal to the pitch spacing E and ranging from about 2 to 5 times the diameter of the holes.

In this configuration, the multiform holes 34,36 are uniformly distributed along the radial span of the common row, with the oval first outlets 44 being conveniently disposed in the available land between the diverging second outlets 48. The film cooling air discharged from the diverging outlets 48 spreads laterally as it flows in the aft downstream direction. The film cooling air is discharged from the oval first outlets 44 with a greater velocity than the second holes 36 and bridges the diffusion film cooling air from hole to hole and reenergizes that slower moving air.

Figure 6:
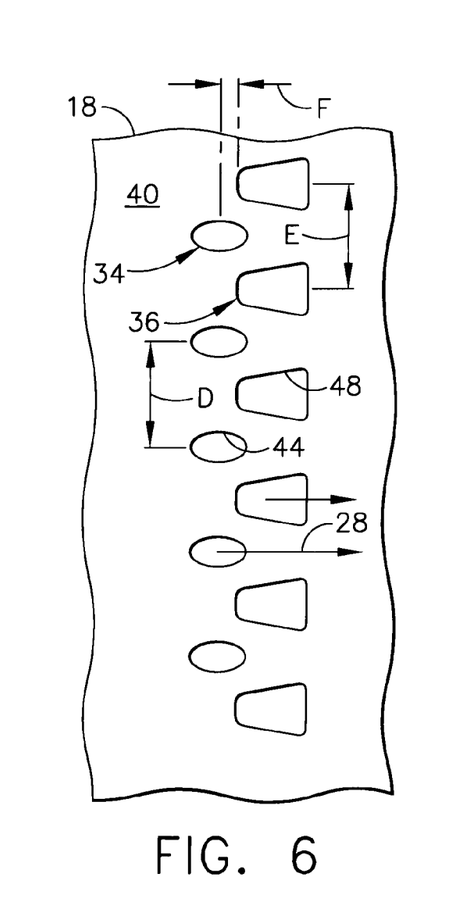
FIG. 6 is an enlarged elevational side view, like FIG. 3, of a row of multiform holes in another embodiment.

FIG. 6 illustrates a modification of the row of multiform holes 34,36 in which the first outlets 44 are offset in axial spacing F only in part forward of the corresponding second outlets 48 in the upstream direction toward the corresponding inlets thereof. The first outlets 44 may be offset in most part from the upstream ends of the second outlets 48 to maintain the common lateral row thereof without uncoupling the two forms of holes into two independent and discrete holes of only the tubular first holes 34 and the diffusion second holes 36.

In this configuration the first holes 34 are located further forward from the second holes 36, which permits the second holes to have a closer pitch spacing E than in the FIG. 3 embodiment if desired. Since the diverging outlets 48 define converging lands between successive second holes 36, more space is available between the forward ends of the second outlets to position the corresponding first outlets 44.

That additional lateral space may be decreased to increase the packing density of the holes in the common row. The corresponding density and coverage of the collective multiform holes 34,36 may therefore be adjusted to maximize performance and coverage of the holes in the common row.

However, by positioning the first holes 34 upstream of the second holes 36, they are also positioned at a greater distance from the downstream target region which follows the aft ends of the second holes 36. As indicated above, the effectiveness of film cooling air decreases in the downstream direction from the outlet ends of the film cooling holes, which is typically accommodated by introducing additional rows of film cooling holes downstream therefrom. A tradeoff in performance of the different packing pattern of first and second holes illustrated in FIG. 6 may be made for the various performance features of the holes individually and collectively.

Figure 7:
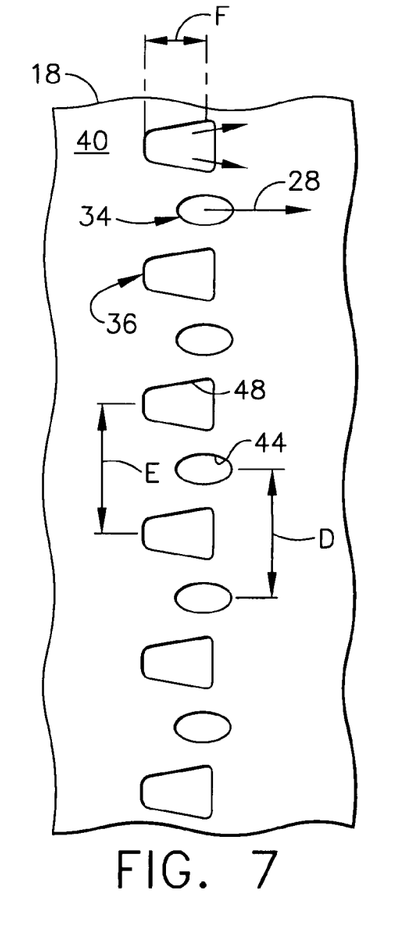
FIG. 7 is an enlarged elevational side view, like FIG. 3, of a row of multiform holes in another embodiment.

FIG. 7 illustrates another modification of the packing of the first and second holes 34,36 in which the first outlets 44 are offset in axial spacing F only in part aft from the corresponding second outlets 48 in the downstream direction away from the corresponding inlets of these holes. In this configuration, the first outlets 44 may extend in part past the aft end of the shaped outlets 48 for discharging the higher velocity film cooling air from the first holes 34 with a greater effective downstream coverage than either of the embodiments illustrated in FIGS. 3 and 6.

As indicated above, the first holes 34 should be within the axial range of the second holes 36 to prevent the formation of two independent and distinct rows of only cylindrical holes and only diffusion holes uncoupled in performance from each other. Since the diverging outlets 48 converge between successive second outlets 48 less space is available for introducing the first outlets 44.

Accordingly, the second holes 36 in this embodiment preferably have a wider or larger pitch spacing E than in the FIG. 3 embodiment. The larger pitch spacing increases the lateral space between the converging sides of adjacent second outlets 48 to provide adequate room for packing the aft-offset first holes 34 between adjacent second holes 36.

FIGS. 3, 6, and 7 illustrate different embodiments where the two different forms of film cooling holes 34,36 may be varied in axial or offset spacing F from each other, as well as varied in radial or pitch spacing D,E from each other for adjusting the packing density thereof, the collective outlet coverage, and the complementary performance of the film cooling air jets discharged from the different first and second outlets 44,48.

These three figures also illustrate that the first and second multiform holes 34,36 may alternate equally in turn in the common row thereof in a one to one arrangement thereof. The corresponding benefits of the cylindrical first holes 34 may therefore be combined with the corresponding benefits of the diffusion second holes 36 in a common row having synergy of configuration and performance as discussed above.

Figure 8:
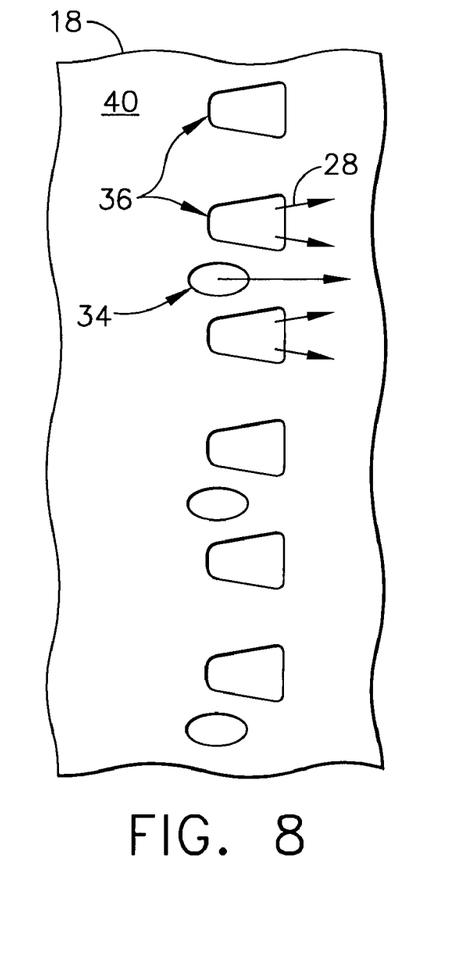
FIG. 8 is an enlarged elevational side view, like FIG. 3, of a row of multiform holes in another embodiment.

FIG. 8 illustrates yet another embodiment of the multiform holes 34,36 in which the first cylindrical holes 34 alternate in a one to two sequence with the diffusion second holes 36. In this way, the combined effects of two adjacent diffusion holes 36 may be combined with a single cylindrical first hole 34 disposed in turn between successive pairs of the second holes 36.

Figure 9:
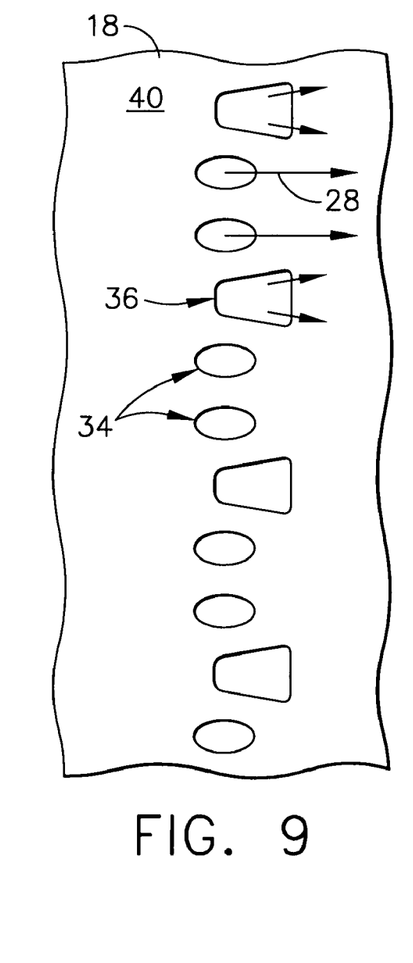
FIG. 9 is an enlarged elevational side view, like FIG. 3, of a row of multiform holes in another embodiment.

FIG. 9 illustrates yet another embodiment in which the multiform holes alternate with two first cylindrical holes 34 and one diffusion second hole 36 between respective pairs of the first holes 34. In this way, two successive cylindrical holes 34 may discharge the higher velocity film cooling air downstream therefrom between next adjacent diffusion holes 36 on opposite sides thereof, and with the distributed film cooling air discharged therefrom. Since two cylindrical holes 34 alternate with a single diffusion hole 36 in the FIG. 9 embodiment, the corresponding manufacturing cost to introduce the holes is less than a full row of the diffusion holes themselves.

Figure 10:
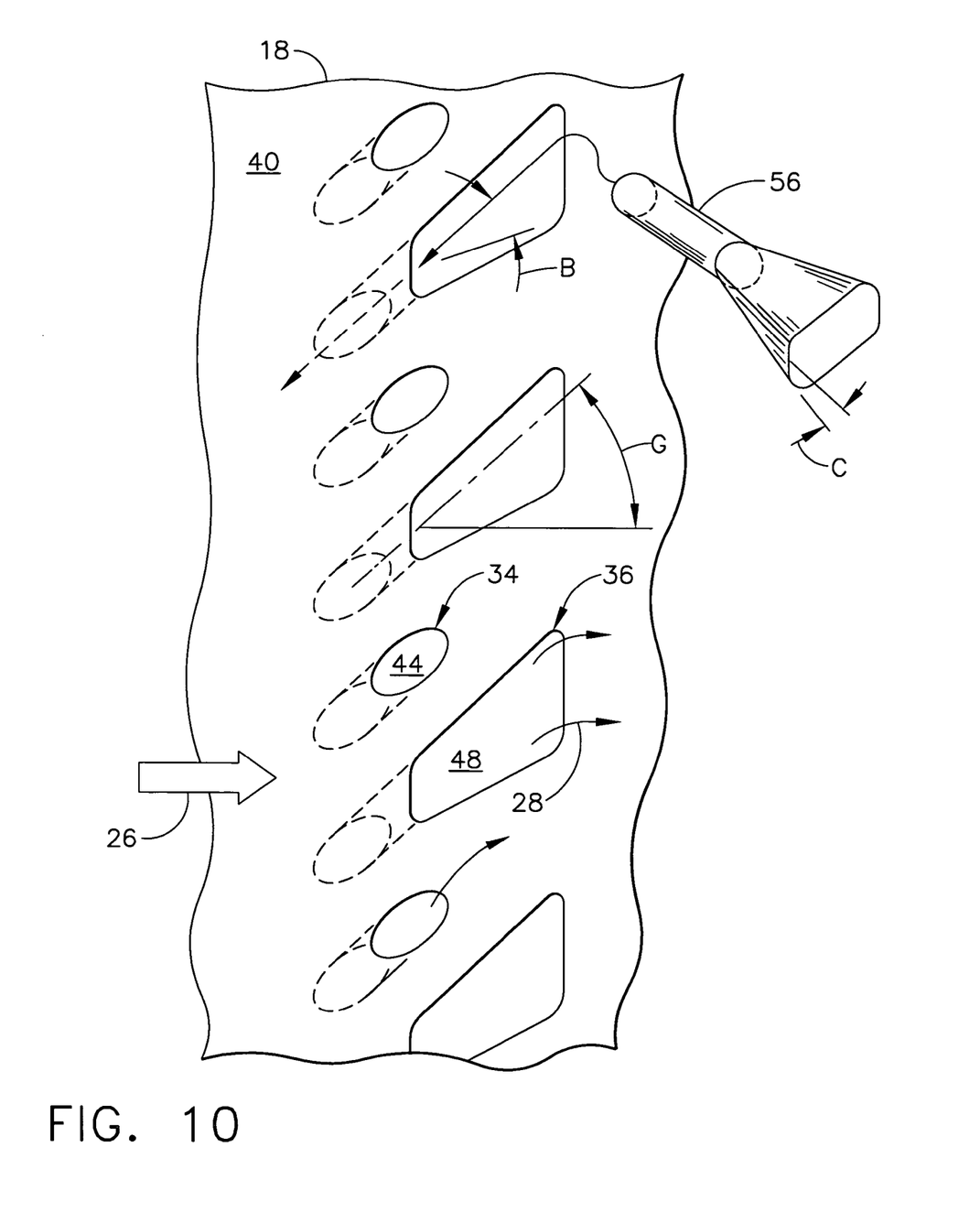
FIG. 10 is an enlarged elevational side view, like FIG. 3, of a row of multiform holes in another embodiment.

FIG. 10 illustrates yet another embodiment of the first and second holes 34,36 which extend longitudinally through the wall at a compound inclination angle both longitudinally and laterally. As indicated above, both types of holes have shallow inclination angles A,B as they extend longitudinally through the wall to reach the internal cooling circuit 24 from which they discharge the spent cooling air.

In FIG. 10, both holes 34,36 further include similar lateral inclination angles G, about 45 degrees for example, along the span of the common row which turns these holes laterally from the nominally axial downstream direction of the combustion gases. Each film cooling hole 34,36 is therefore inclined with a compound angle to further spread the discharged film cooling air laterally for increasing the thermal protection from the hot combustion gases.

The compound angle configuration of the multiform holes 34,36 introduces yet another variable useful in modifying the design thereof for maximizing cooling performance with minimal cooling air. The compound angle first holes 34 remain generally symmetrical, with oval inlets and oval outlets.

However, the diverging second outlets 48 include not only the three inclination angles B,C,G but also the diffusion half-angles of their sidewalls, which results in the perimeters thereof being distorted or skewed asymmetrically along the outboard surface 40. In FIG. 3, the basic profile of the second outlets 48 is trapezoidal and symmetrical. In FIG. 10, the compound inclination distorts the outlet trapezoid into a skewed teardrop shape. Nevertheless, the resulting multiple forms of the first and second holes enjoy the enhanced cooling performance due to the cooperation thereof.

The shaped diffusion holes 36 of all embodiments illustrated may be made using a common EDM tool 56, as shown in FIG. 10. The tool 56 has a cylindrical distal end integrally formed with a larger proximal end which converges in size to the cylinder. The proximal end has sidewalls which diverge at the desired diffusion half-angles. The proximal end is coaxial with the cylinder, and has one wall being aligned with the cylinder, and an opposite wall inclined at the angle C illustrated in FIG. 5.

In FIG. 5, the EDM tool 56 would be driven through the wall 18 at the single inclination angle B to form by Electrical Discharge Machining the resulting second hole 36 illustrated.

In FIG. 10, the EDM tool 56 is driven through the wall 18 with the compound inclination angles B and G to form the resulting compound angle second holes 36 of this embodiment.

As indicated above, the prior art is replete with various forms of film cooling holes for providing different advantages. The ability to now alternate in a common row two or more different forms of otherwise conventional film cooling holes permits additional tailoring of cooling performance in various gas turbine engine components. The several Figures disclosed above illustrate basic modifications and packing configurations utilizing two different types of film cooling holes in a common row in a turbine component.

Since film cooling holes are ubiquitous in typical gas turbine engines, FIG. 1 illustrates schematically that the multiform holes 34,36 may be used in the hollow turbine airfoil 12 of the rotor blade 10 in any desired location around the external surface thereof including either the pressure sidewall, or the suction sidewall, or both, as desired.

FIG. 1 also illustrates schematically that the multiform holes 34,36 may also be used in the hollow airfoil vane 50 of the typical turbine stator nozzle in which the opposite pressure and suction sides thereof extend between radially outer and inner bands (not shown). First stage nozzle vanes are typically hollow and provided with internal cooling circuits which discharge the spent cooling air through various rows of film cooling holes through the sidewalls thereof. The multiform holes may be conveniently introduced in the nozzle vane at any suitable location around the external surface thereof.

FIG. 1 also illustrates schematically that the multiform holes 34,36 may also be used in a typical annular inner or outer combustion liner 52 as desired in any region which would otherwise utilize conventional film cooling holes.

As indicated above, turbine shrouds 54 surround the radially outer tips of the turbine blade illustrated in FIG. 1 and typically include film cooling. Accordingly, the multiform holes 34,36 may also be introduced in the turbine shrouds 54 as desired in lieu of conventional patterns of film cooling holes.

FIG. 1 also illustrates schematically that there are various other components in the typical gas turbine engine in which film cooling holes are found in various patterns. The introduction of the multiform holes 34,36 in the various components of the gas turbine engine may be used to advantage for enjoying the complementary performance of the different first and second holes in a complementary packing. Conventional film cooling holes are commonly used in linear rows or two-dimensional patterns of many rows all with a single form of the film cooling hole. The ability to alternate different forms of film cooling holes in local regions of gas turbine engine components permits another variable in the film cooling performance thereof which may be used to advantage in maximizing efficiency of gas turbine engines.

Since the various patterns of film cooling holes typically include corresponding rows, any one or more of those rows may be modified for introducing the alternating multiform holes 34,36 for enjoying the complementary performance thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

I claim:

1. A turbine wall comprising:
   a plurality of cylindrical film cooling first holes arranged in a common row; and
   a plurality of diverging diffusion film cooling second holes alternating laterally with said first holes in said common row, and having a different form than said first holes.

2. A wall according to claim 1 wherein said first and second holes are inclined through said wall between opposite inboard and outboard surfaces thereof, with corresponding first and second inlets on said inboard surface and first and second outlets on said outboard surface.

3. A wall according to claim 2 wherein said second inlet is cylindrical, and said second outlet diverges aft therefrom.

4. A wall according to claim 3 wherein said first outlets are offset in part forward from said second outlets.

5. A wall according to claim 3 wherein said first outlets are offset in part aft from said second outlets.

6. A wall according to claim 3 wherein said first and second holes extend longitudinally through said wall at a compound inclination angle both longitudinally and laterally.

7. A wall according to claim 6 wherein said second outlets are asymmetrical along said outboard surface.

8. A wall according to claim 3 wherein said first and second holes alternate one to one.

9. A wall according to claim 3 wherein said first and second holes alternate one to two, respectively.

10. A wall according to claim 3 wherein said first and second holes alternate two to one, respectively.

11. A turbine wall comprising a common row of multiform film cooling holes having different shapes including diffusion holes alternating and diverging laterally in said common row.

12. A wall according to claim 11 wherein said multiform holes include a plurality of first film cooling holes inclined between inboard and outboard surfaces of said wall, and a plurality of different second film cooling holes alternating laterally with said first holes.

13. A turbine wall comprising a plurality of tubular first film cooling holes and a plurality of diffusion second film cooling holes alternating laterally with said first holes in a common row therewith, and inclined between inboard and outboard surfaces of said wall.

14. A wall according to claim 13 wherein:
   each of said first holes has a first inlet in said inboard surface, and first outlet in said outboard surface with a common flow area therebetween; and
   each of said second holes has a second inlet in said inboard surface, and a larger second outlet in said outboard surface.

15. A wall according to claim 14 wherein said first and second inlets are substantially identical.

16. A wall according to claim 14 wherein said first and second inlets and said first outlets are substantially identical.

17. A wall according to claim 14 wherein said first and second holes are similarly inclined through said wall, and said second holes diverge from said second inlets thereof at a shallower inclination angle at said second outlets.

18. A wall according to claim 14 wherein said first and second inlets and said first outlets are elliptical, and said second outlets are trapezoidal.

19. A wall according to claim 14 wherein said first outlets are colinearly aligned with said second outlets.

20. A wall according to claim 14 wherein said first outlets are offset in part forward from said second outlets.

21. A wall according to claim 14 wherein said first outlets are offset in part aft from said second outlets.

22. A wall according to claim 14 wherein said first and second holes have substantially equal pitch spacing.

23. A wall according to claim 14 wherein said first and second holes extend longitudinally through said wall at a compound inclination angle both longitudinally and laterally.

24. A wall according to claim 23 wherein said second outlets are asymmetrical along said outboard surface.

25. A wall according to claim 14 wherein said first and second holes alternate one to one.

26. A wall according to claim 14 wherein said first and second holes alternate one to two, respectively.

27. A wall according to claim 14 wherein said first and second holes alternate two to one, respectively.

28. A wall according to claim 14 comprising a gas turbine rotor airfoil.

29. A wall according to claim 14 comprising a gas turbine nozzle vane.

30. A wall according to claim 14 comprising a gas turbine combustion liner.

31. A wall according to claim 14 comprising a gas turbine shroud.

* * * * *